United States Patent
Sodagar et al.

(10) Patent No.: US 10,928,588 B2
(45) Date of Patent: Feb. 23, 2021

(54) TRANSCEIVER MODULE FOR OPTICAL COMMUNICATION

(71) Applicant: Skorpios Technologies, Inc., Albuquerque, NM (US)

(72) Inventors: Majid Sodagar, Albuquerque, NM (US); Stephen B. Krasulick, Albuquerque, NM (US); John Zyskind, Albuquerque, NM (US); Paveen Apiratikul, Albuquerque, NM (US); Luca Cafiero, Palo Alto, CA (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 16/160,706

(22) Filed: Oct. 15, 2018

(65) Prior Publication Data

US 2019/0113680 A1    Apr. 18, 2019

Related U.S. Application Data

(60) Provisional application No. 62/572,304, filed on Oct. 13, 2017.

(51) Int. Cl.

| G02B 6/12 | (2006.01) |
|---|---|
| G02B 6/122 | (2006.01) |
| G02B 6/26 | (2006.01) |
| H04B 10/40 | (2013.01) |
| H04B 10/25 | (2013.01) |
| G02B 6/30 | (2006.01) |

(Continued)

(52) U.S. Cl.
CPC .............. *G02B 6/1225* (2013.01); *G02B 6/26* (2013.01); *G02B 6/305* (2013.01); *G02B 6/4246* (2013.01); *H04B 10/25* (2013.01); *H04B 10/40* (2013.01); *H04J 14/02* (2013.01)

(58) Field of Classification Search
CPC ........ G02B 6/1225; G02B 6/26; H04B 10/25; H04B 10/40; H04J 14/02
See application file for complete search history.

(56) References Cited

U.S. PATENT DOCUMENTS

| 3,894,789 A | 7/1975 | Kobayashi et al. |
|---|---|---|
| 5,780,875 A | 7/1998 | Tsuji et al. |

(Continued)

FOREIGN PATENT DOCUMENTS

| WO | 2014-083507 A2 | 6/2014 |
|---|---|---|
| WO | 2015-054491 A1 | 4/2015 |

OTHER PUBLICATIONS

Doerr, Christopher (Silicon photonic integration in telecommunications, Frontiers in Physics www.frontiersin.org Aug. 1, 2015, vol. 3, Article 37 (Year: 2015).*

(Continued)

*Primary Examiner* — Peter Radkowski
(74) *Attorney, Agent, or Firm* — Kilpatrick Townsend & Stockton LLP (57) ABSTRACT

A device for optical communication is described. The device comprises two transceivers integrated on one chip. A first transceiver can be used with existing optical-communication architecture. As a more advanced optical-communication architecture becomes adopted, the device can be switched from using the first transceiver to using a second transceiver to communicate using the more advanced optical-communication architecture.

18 Claims, 5 Drawing Sheets

(51) Int. Cl.
*G02B 6/42* (2006.01)
*H04J 14/02* (2006.01)

(56) References Cited

U.S. PATENT DOCUMENTS

| | | | |
|---|---|---|---|
| 6,259,841 B1 | 7/2001 | Bhagavatula | |
| 6,393,171 B2 | 5/2002 | Sasaki et al. | |
| 6,888,984 B2 | 5/2005 | Abeles | |
| 7,359,593 B2 | 4/2008 | Little | |
| 7,470,069 B1 | 12/2008 | Offrein et al. | |
| 7,583,900 B2* | 9/2009 | Dallesasse | G02B 6/4201 398/135 |
| 7,805,037 B1 | 9/2010 | Van Der Vliet et al. | |
| 7,853,150 B2* | 12/2010 | Hudgins | H04B 10/40 385/88 |
| 7,918,611 B2* | 4/2011 | Hudgins | H04B 10/40 385/92 |
| 8,064,493 B2 | 12/2011 | Behfar et al. | |
| 8,165,471 B2* | 4/2012 | Theodoras, II | H04L 49/30 385/89 |
| 8,385,751 B2* | 2/2013 | Lyubomirsky | H04J 14/028 398/183 |
| 8,463,088 B1 | 6/2013 | Asghari et al. | |
| 8,744,268 B2* | 6/2014 | Lou | H04B 10/40 398/101 |
| 8,755,650 B2 | 6/2014 | Peng | |
| 9,048,958 B2 | 6/2015 | Chaahoub et al. | |
| 9,097,846 B2 | 8/2015 | Mizrahi et al. | |
| 9,316,785 B2 | 4/2016 | Krasulick et al. | |
| 9,341,786 B1* | 5/2016 | Gamache | G02B 6/30 |
| 9,467,227 B2* | 10/2016 | Masini | H04B 10/0779 |
| 9,625,651 B2 | 4/2017 | Kumar et al. | |
| 9,658,401 B2 | 5/2017 | Li et al. | |
| 9,819,420 B2* | 11/2017 | Wen | H04B 10/532 |
| 9,877,091 B2* | 1/2018 | Chen | H04J 14/0246 |
| 9,885,832 B2 | 2/2018 | Lambert et al. | |
| 9,922,967 B2 | 3/2018 | Krasulick | |
| 9,977,188 B2 | 5/2018 | Lambert et al. | |
| 2003/0044118 A1 | 3/2003 | Zhou | |
| 2003/0165293 A1 | 9/2003 | Abeles | |
| 2005/0117844 A1 | 6/2005 | Abeles | |
| 2005/0123244 A1 | 6/2005 | Block | |
| 2005/0202554 A1 | 9/2005 | Luo | |
| 2006/0104322 A1 | 5/2006 | Park | |
| 2006/0115215 A1 | 6/2006 | Liu | |
| 2006/0210215 A1 | 9/2006 | Aoki et al. | |
| 2006/0285797 A1 | 12/2006 | Little | |
| 2007/0116410 A1 | 5/2007 | Kwakernaak | |
| 2007/0147761 A1 | 6/2007 | Kwakernaak | |
| 2007/0242919 A1 | 10/2007 | Welch | |
| 2008/0044128 A1* | 2/2008 | Kish, Jr. | G02B 6/12004 385/14 |
| 2008/0166131 A1* | 7/2008 | Hudgins | H04B 10/40 398/117 |
| 2008/0180340 A1 | 7/2008 | Hobbs | |
| 2008/0187316 A1* | 8/2008 | Dallesasse | G02B 6/4201 398/91 |
| 2009/0016685 A1* | 1/2009 | Hudgins | H04B 10/40 385/92 |
| 2009/0257754 A1* | 10/2009 | Theodoras, II | H04L 49/30 398/135 |
| 2009/0303579 A1 | 12/2009 | Winterberg | |
| 2010/0040327 A1 | 2/2010 | Deki | |
| 2010/0213467 A1 | 8/2010 | Lee et al. | |
| 2010/0284019 A1 | 11/2010 | Fukuda | |
| 2010/0284698 A1 | 11/2010 | McColloch | |
| 2010/0303469 A1 | 12/2010 | Barton et al. | |
| 2011/0085572 A1 | 4/2011 | Dallesasse | |
| 2011/0142446 A1* | 6/2011 | Lyubomirsky | H04J 14/0278 398/43 |
| 2011/0205660 A1 | 8/2011 | Komura | |
| 2011/0280579 A1 | 11/2011 | Mclaren et al. | |
| 2012/0183289 A1* | 7/2012 | Lou | H04B 10/272 398/9 |
| 2013/0039664 A1 | 2/2013 | Clifton et al. | |
| 2013/0051727 A1 | 2/2013 | Mizrahi et al. | |
| 2013/0064514 A1 | 3/2013 | Peng | |
| 2013/0230272 A1 | 9/2013 | Raj et al. | |
| 2014/0029951 A1 | 1/2014 | Handelman | |
| 2014/0177222 A1 | 6/2014 | Barwicz et al. | |
| 2014/0342479 A1 | 11/2014 | Marchena | |
| 2014/0352759 A1 | 12/2014 | Barnes | |
| 2015/0097210 A1 | 4/2015 | Krasulick | |
| 2015/0098676 A1 | 4/2015 | Krasulick | |
| 2015/0099318 A1 | 4/2015 | Krasulick | |
| 2015/0123157 A1 | 5/2015 | Dallesasse et al. | |
| 2015/0177458 A1 | 6/2015 | Bowers et al. | |
| 2015/0249501 A1 | 9/2015 | Nagarajan | |
| 2015/0255952 A1 | 9/2015 | Chaouch et al. | |
| 2015/0260913 A1 | 9/2015 | Li et al. | |
| 2015/0341123 A1 | 11/2015 | Nagarajan | |
| 2016/0182151 A1* | 6/2016 | Masini | H04B 10/40 398/139 |
| 2016/0261352 A1* | 9/2016 | Wen | H04B 10/532 |
| 2016/0301191 A1 | 10/2016 | Orcutt | |
| 2017/0164076 A1* | 6/2017 | Chen | H04J 14/0246 |
| 2017/0227709 A1 | 8/2017 | Lambert | |
| 2017/0229840 A1 | 8/2017 | Lambert | |
| 2017/0230117 A1 | 8/2017 | Li et al. | |
| 2017/0301494 A1 | 10/2017 | Itoda et al. | |
| 2017/0331248 A1 | 11/2017 | Lambert | |

OTHER PUBLICATIONS

Gokhale, Milind, The Road to 100G Ethernet in the Data Center Part 1: PSM4 and CWDM, NeoPhotonics, Feb. 3, 2017; available at https://www.neophotonics.com/road-100g-ethernet-data-center-part-1-psm4-cwdm/; (Year: 2017).*
Pacific Microchip Corporation, Transceiver ASIC for 100Gbps Detector Data Link,DE-FG02-12ER90341, available at https://www.sbir.gov/print/sbirsearch/detail/390513 (Year: 2012).*
Farrington, Nathan, Optics in data center network architecture, 2012, UC San Diego Electronic Theses and Dissertations, https://escholarship.org/uc/item/8nv683wc (Year: 2012).*
Dris et al., A programmable, multi-format photonic transceiver platform enabling flexible optical networks, 2015 17th International Conference on Transparent Optical Networks (ICTON), Budapest, 2015, pp. 1-4 (Year: 2015).*
Vanhoecke et al., Segmented Optical Transmitter Comprising a CMOS Driver Array and an InP IQ-MZM for Advanced Modulation Formats, in Journal of Lightwave Technology, vol. 35, No. 4, pp. 862-867, 15 Feb. 15, 2017. (Year: 2017).*
Vitex, 100Gb/s QSFP28 IR4 Parallel Single Mode Optical Transceiver, Dec. 2016, available at http://www.vitextech.com/wp-content/uploads/2017/10/TR-VC13T-N00QSFP28-IR4-PSM-Datasheet-Rev1.4.pdf (Year: 2016).*
Instructions for Completing a DOE SBIR/STTR Phase I Grant Application (Year: 2020).*
Cherchi, et al.; "Dramatic size reduction of waveguide bends on a micron-scale silicon photonic platform"; *Optics Express*, Jul. 29, 2013; vol. 21, No. 15; DOI:10.1364/OE.21.017814; all pages.
PCT/US2017/016994 filed Feb. 8, 2017 received an ISR/WO Apr. 20, 2017, 1 0 pages.
PCT/US2017/016958 received an International Preliminary Report on Patentability, dated Aug. 23, 2018, 9 pages.
International Search Report and Written Opinion dated Apr. 25, 2017 for International Patent Application No. PCT/US2017/016968; all pages.
International Search Report and Written Opinion dated Apr. 25, 2017 for International Patent Application No. PCT/US2017/016958; all pages.
U.S. Appl. No. 15/426,823 received a Non-Final Office Action dated May 17, 2018, 16 pages.
U.S. Appl. No. 15/426,823 received a Non-Final Office Action dated Dec. 14, 2018, 15 pages.

* cited by examiner

TRANSCEIVER MODULE FOR OPTICAL COMMUNICATION

CROSS-REFERENCES TO RELATED APPLICATIONS

This application claims priority to U.S. Provisional Patent Application No. 62/572,304, filed on Oct. 13, 2017, the disclosure of which is incorporated by reference in its entirety for all purposes.

BACKGROUND OF THE INVENTION

Silicon integrated circuits ("ICs") have dominated the development of electronics and many technologies based upon silicon processing have been developed over the years. Their continued refinement led to nano-scale feature sizes that can be important for making metal oxide semiconductor CMOS circuits. On the other hand, silicon is not a direct-bandgap material. Although direct-bandgap materials, including III-V compound semiconductor materials, have been developed, there is a need in the art for improved methods and systems related to photonic ICs utilizing silicon substrates.

BRIEF SUMMARY OF THE INVENTION

Embodiments of the present invention provide devices, systems, and/or methods of a composite device, such combining functionality of two different semiconductor materials to create an optical device.

In some embodiments, an apparatus used as an optical transceiver comprises: a photonic chip; a first transmitter integrated on the photonic chip, wherein the first transmitter is configured to use a first optical communication protocol; a first receiver integrated on the photonic chip, wherein the first receiver is configured to use the first optical communication protocol; a second transmitter integrated on the photonic chip, wherein the second transmitter is configured to use a second optical communication protocol; a second receiver integrated on the photonic chip, wherein the second receiver is configured to use the second optical communication protocol; and a plurality of input waveguides, wherein: the plurality of input waveguides are integrated on the photonic chip; and the plurality of input waveguides are configured to guide light received from off of the photonic chip to the first receiver and to the second receiver; and/or a plurality of output waveguides, wherein: the plurality of output waveguides are integrated on the photonic chip; and/or the plurality of output waveguides are configured to guide light from the first transmitter and from the second transmitter off of the photonic chip. In some embodiments, the apparatus further comprises: a first switch electrically coupled with a plurality of electrical inputs, with the first transmitter, and with the second transmitter, wherein the first switch is used to change routing of input signals of the plurality of electrical inputs from the first transmitter to the second transmitter; a second switch electrically coupled with a plurality of electrical outputs, with the first receiver, and with the second receiver, wherein the second switch is used to change routing of output signals to the plurality of electrical outputs from the first receiver to the second receiver; a fiber array optically coupled with the plurality of input waveguides and the plurality of output waveguides; an optical connector for coupling to a fiber ribbon cable, wherein the optical connector is optically coupled with the fiber array; a first gain medium, wherein the first gain medium is optically coupled with a first modulator and a second modulator; a second gain medium, wherein the second gain medium is optically coupled with a third modulator and a fourth modulator; four optical emitters; a multiplexer for combining light from the four optical emitters; and/or a spot-size converter integrated on the photonic chip, wherein the spot-size converter is used to expand an optical beam from a waveguide the plurality of output waveguides to an optical fiber, wherein the optical fiber has a larger cross section than the waveguide of the plurality of output waveguides. In some embodiments, the plurality of electrical inputs consists of four electrical inputs configured to transmit at 25 Gb/s; the first optical communication protocol is PSM4; the second optical communication protocol is CWDM4; spacing between waveguides of the plurality of input waveguides and of the plurality of output waveguides are spaced to match spacing of fibers in the fiber array; a number of fibers in the fiber array is equal to twelve; the plurality of output waveguides comprise: four waveguides optically coupled to the first transmitter, and only one waveguide optically coupled to the second transmitter; the plurality of input waveguides comprise: four waveguides optically coupled to the first receiver, and only one waveguide optically coupled to the second receiver; the plurality of input waveguides are made of crystalline silicon; the plurality of output waveguides are made of crystalline silicon; and/or a spot-size converter is formed using amorphous silicon or polycrystalline silicon.

In some embodiments, a method for using an optical device comprises: transmitting, using a first transmitter integrated on a chip, modulated light corresponding to optical communication using a first optical-communication protocol; guiding light transmitted by the first transmitter using a plurality of output waveguides integrated on the chip; guiding light received from off the chip using a plurality of input waveguides integrated on the chip; detecting, using a first receiver integrated on the chip, modulated light corresponding to optical communication using the first optical-communication protocol; configuring the optical device to use a second transmitter and a second receiver instead of using the first transmitter and the first receiver; transmitting, using the second transmitter integrated on the chip, modulated light corresponding to optical communication using a second optical-communication protocol; guiding light transmitted by the second transmitter using one or more output waveguides integrated on the chip; guiding light received from off the chip using one or more input waveguides integrated on the chip; and/or detecting, using the second receiver integrated on the chip, modulated light corresponding to optical communication using the second optical-communication protocol. In some embodiments, the first optical-communication protocol uses one optical signal per waveguide and the second optical-communication protocol uses multiple optical signals per waveguide.

In some embodiments, an apparatus comprises: a photonic chip; a first transmitter integrated on the photonic chip; a first receiver integrated on the photonic chip; a second transmitter integrated on the photonic chip; a second receiver integrated on the photonic chip; a plurality of spot-size converters; and/or a plurality of waveguides optically coupling the first transmitter, the first receiver, the second transmitter, and the second receiver with the plurality of spot-size converters. In some embodiments, the photonic chip comprises a silicon substrate; a spacing between the plurality of spot-size converters is configured to match a spacing between ports of an optical connector; the first transmitter comprises parallel transmissions on multiple waveguides of the plurality of waveguides; and/or the second transmitter comprises a multiplexer to transmit multiple optical-transmission signals in a single waveguide of the plurality of waveguides.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This application relates to optical transceivers. Optical transceivers are used for generating and receiving signals in optical-fiber communication. Embodiments relate, without limitation, to a photonic chip with two or more transceivers (e.g., a photonic chip with two transceivers). Course Wavelength Division Multiplexing (CWDM) is a method to combine several optical signals in one optical fiber. CWDM4 is an optical interface standard (e.g., http://www.cwdm4-msa.org) for CWDM 100 Gb/s transmission on a duplex fiber pair. Parallel single-mode fiber 4 (PSM4) is an optical interface standard for 100 Gb/s optical interconnects (e.g., psm4.org) on 4 fibers (e.g., 4 fibers in each direction). A Quad Small Form-factor Pluggable (QSFP) module is a compact, hot-pluggable transceiver for data communication (e.g., https://en.wikipedia.org/wiki/QSFP) ranging from 4×1 to 4×28 Gb/s.

The present disclosure describes a CWDM4+PSM4 QSFP Module. There is a large existing market for 4×25 Gb/s PSM4 modules and an emerging market for 100 Gb/s CWDM4, each using a QSFP form factor. The present disclosure leverages integration capabilities of silicon photonics to create a product that can be deployed initially for 4×25 Gb/s PSM4 operation and then upgraded to 100 Gb/s CWDM operation. Software can be configurable for compliance with 4×25 Gb/s PSM4 operation and/or compliance with 100 Gb/s CWDM4 operation. Thus the CWDM4+PSM4 QSFP Module can serve both the existing PSM4 market while protecting hardware investment by being able to convert to 100 Gb/s CWDM4 when desired. Thus components of two or more transceivers can be made on one chip at one cost and yet have multiple functionality.

Figure 1:
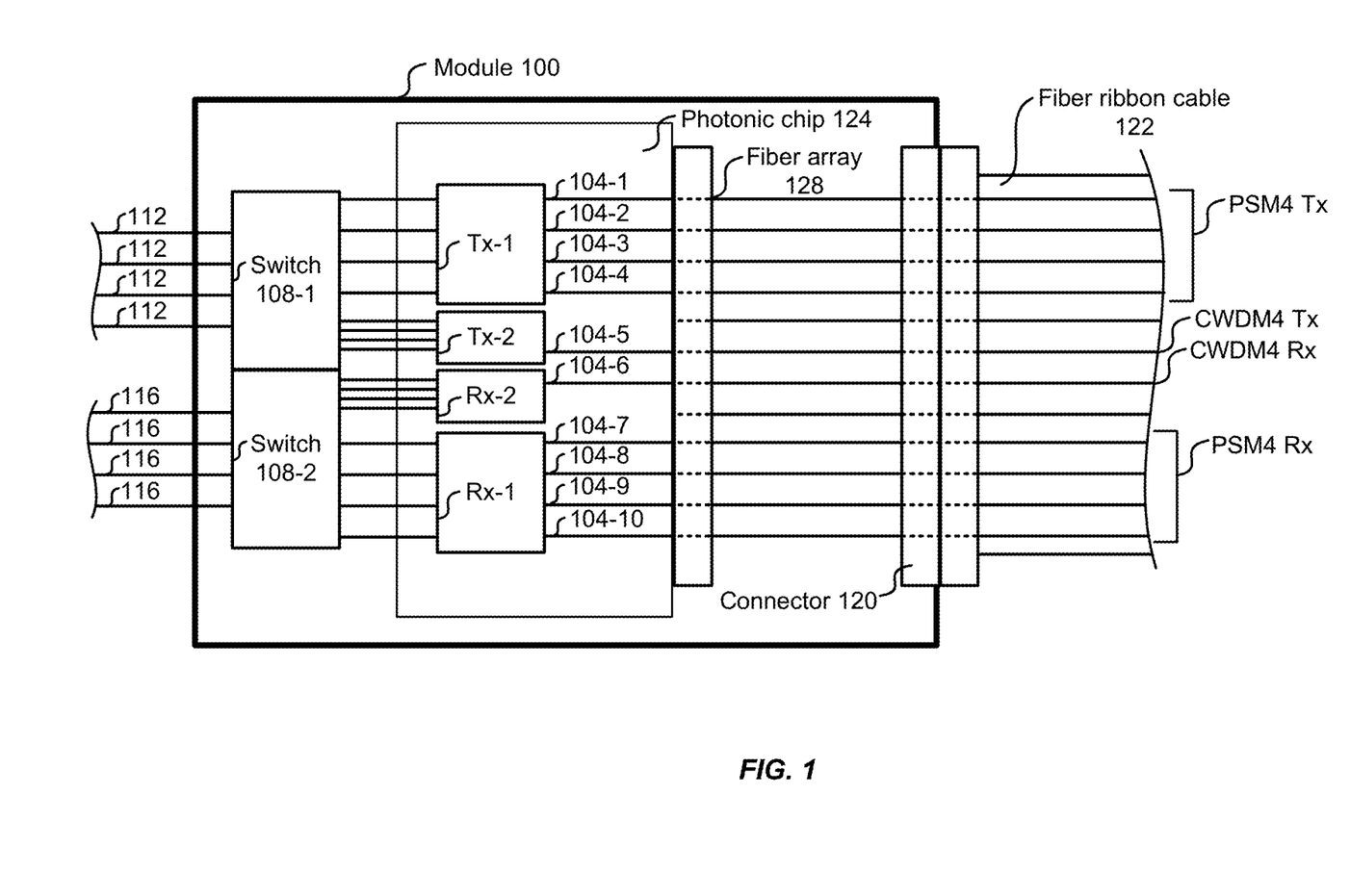
FIG. 1 depicts an embodiment of an optical-communication module having two transceivers.

FIG. 1 depicts an embodiment of a module 100 for optical-communication. The module 100 is a QSFP module. The module 100 comprises waveguides 104, a first transceiver, a second transceiver, a first switch 108-1, and a second switch 108-2. The first transceiver comprises a first transmitter Tx-1 and a first receiver Rx-1. The second transceiver comprises a second transmitter Tx-2 and a second receiver Rx-2.

The first transmitter Tx-1 is a PSM4 transmitter. PSM4 is a first optical communication standard. A PSM4 transmitter uses four physically separate communication signals (e.g., using four different waveguides 104) as optical outputs, and each optical output carries one optical communication signal. The first receiver Rx-1 is a PSM4 receiver. A PSM4 receiver uses four physically separate optical communication signals for optical inputs.

The second transmitter Tx-2 is a CWDM4 transmitter. CWDM4 is a second optical communication standard. A CWDM4 transmitter combines four communication signals (e.g., using a multiplexer) for transmission in a single waveguide. Accordingly, the CWDM4 transmitter has only one optical output. The second receiver Rx-2 is a CWDM4 receiver. A CWDM4 receiver has one optical input having four communication signals. The CWDM4 separates the four communication signals from the one optical input (e.g., using a demultiplexer).

The first switch 108-1 is a radio frequency (RF) switch (e.g., a 4×8 switch). The first switch 108-1 is electrically coupled with the first transmitter Tx-1 and to the second transmitter Tx-2. The second switch 108-2 is an RF switch. The second switch 108-2 is electrically coupled with the first receiver Rx-1 and the second receiver Rx-2. The first switch 108-1 is electrically coupled with RF inputs 112 (e.g., four RF inputs 112 having a data rate of 25 Gb/s each). The second switch 108-2 is electrically coupled with RF outputs 116 (e.g., four RF outputs 116 having a data rate of 25 Gb/s each). The RF inputs 112, the RF outputs 116, and/or the switches 108 can be software configured to switch between operating using the first transceiver and the second transceiver (e.g., alternating between operating using PSM4 and operating using CWDM4 by changing a routing of signals from the first transceiver to the second transceiver).

RF inputs 112 are electrical inputs. RF outputs 116 are electrical outputs. In some embodiments, only four RF inputs 112 are used and/or only four RF outputs 116 are used (e.g., and switches 108 are software programmable to switch between the first transceiver and the second transceiver). In some embodiments, the switches 108 are configured to operate the module 100 using the first transceiver and the second transceiver, but not using both the first transceiver and the second transceiver at the same time. In some embodiments eight RF inputs 112 are used and/or eight RF outputs 116 are used (e.g., switches 108 are not used, and hardware connectors are used to switch between using the first transceiver and using the second transceiver; and/or the module 100 is used to concurrently transmit and receive PSM4 and CWDM4 optical communication). The RF inputs 112 and/or the RF outputs 116 are metal (e.g., wires and/or deposited metal on a chip).

A connector 120 is used to couple light onto and off of the module 100. In some embodiments, the connector 120 is half of a multiple-fiber push-on (MPO) connector (e.g., a 1×12 MTP connector). The connector 120 is used to couple light to a fiber ribbon cable 122 (e.g., having 12 optical fibers).

The module 100 is made using a photonic chip 124. The photonic chip 124 is made using a silicon substrate and embedding non-silicon chips in one or more pits of the silicon substrate. An example of using a silicon substrate and bonding non-silicon chips to the silicon substrate can be found in U.S. Pat. No. 9,316,785, granted on Apr. 19, 2016, which is incorporated by reference for all purposes. The first transmitter Tx-1, the second transmitter Tx-2, the first receiver Rx-1, the second receiver Rx-2, and the waveguides 104 are integrated on the photonic chip 124. For example, waveguides 104 are formed in a device layer of the photonic chip 124 (e.g., in crystalline silicon of a silicon-on-insulator chip); components of the transceivers (e.g., gain chips and/or modulators) are III-V chips bonded in pits to a silicon substrate (e.g., as described in the '785 patent); and/or elements, such as a multiplexer, demultiplexer, and/or a laser output coupler are formed in the device layer of the photonic chip (e.g., in crystalline silicon of the silicon-on-insulator chip).

The photonic chip 124 comprises a first waveguide 104-1, a second waveguide 104-2, a third waveguide 104-3, a fourth waveguide 104-4, a fifth waveguide 104-5, a sixth waveguide 104-6, a seventh waveguide 104-7, an eighth waveguide 104-8, a ninth waveguide 104-9, and a tenth waveguide 104-10. The module 100 further comprises a fiber array 128. The fiber array 128 optically couples the waveguides 104 with the connector 120. In some embodiments, the fiber array 128 is not used. For example, the photonic chip 124 is situated on a right side of the module 100 and waveguides 104 of the photonic chip 124 are connected directly to the connector 120. The waveguides 104 are configured to have a spacing between waveguides 104 to match a spacing between fibers of the fiber array 128 and/or between fibers of the fiber ribbon cable 122. In some embodiments, a spot-size converter (SSC) is used to couple light from a waveguide 104 to a fiber of the fiber array 128, or to the connector 120 and/or to optical fibers of the fiber ribbon cable 122 if the fiber array 128 is not used.

The first waveguide 104-1, the second waveguide 104-2, the third waveguide 104-3, and the fourth waveguide 104-4 are optically coupled with the first transmitter Tx-1. Accordingly, the first waveguide 104-1, the second waveguide 104-2, the third waveguide 104-3, and the fourth waveguide 104-4 are used for PSM4 transmission (PSM4 Tx), in the embodiment shown. The fifth waveguide 104-5 is optically coupled with the second transmitter Tx-2. Accordingly, the fifth waveguide 104-5 is used for CWDM4 transmission (CWDM4 Tx). The sixth waveguide 104-6 is optically coupled with the second receiver Rx-2. Accordingly, the sixth waveguide 104-6 is used to receive CWDM4 optical communication (CWDM4 Rx). The seventh waveguide 104-7, the eighth waveguide 104-8, the ninth waveguide 104-9, and the tenth waveguide 104-10 are optically coupled with the first receiver Rx-1. Accordingly, the seventh waveguide 104-7, the eighth waveguide 104-8, the ninth waveguide 104-9, and the tenth waveguide 104-10 are used to receive PSM4 optical communication (PSM4 Rx). While the CWDM4 transceiver is being used exclusively, a duplex LC connector can be inserted in ports of connector 120 corresponding to waveguides 104-5 and 104-6, instead of using a twelve fiber, fiber ribbon cable 122.

The first waveguide 104-1, the second waveguide 104-2, the third waveguide 104-3, the fourth waveguide 104-4, and the fifth waveguide 104-5 are sometimes referred to as output waveguides because those waveguides guide light from a transmitter Tx on the photonic chip 124 to the fiber array 128, and/or to the connector 120, off the photonic chip 124. The sixth waveguide 104-6, the seventh waveguide 104-7, the eighth waveguide 104-8, the ninth waveguide 104-9, and the tenth waveguide 104-10 are sometimes referred to as input waveguides because those waveguides guide light from off the photonic chip 124 to a receiver Rx on the photonic chip 124.

Figure 2:
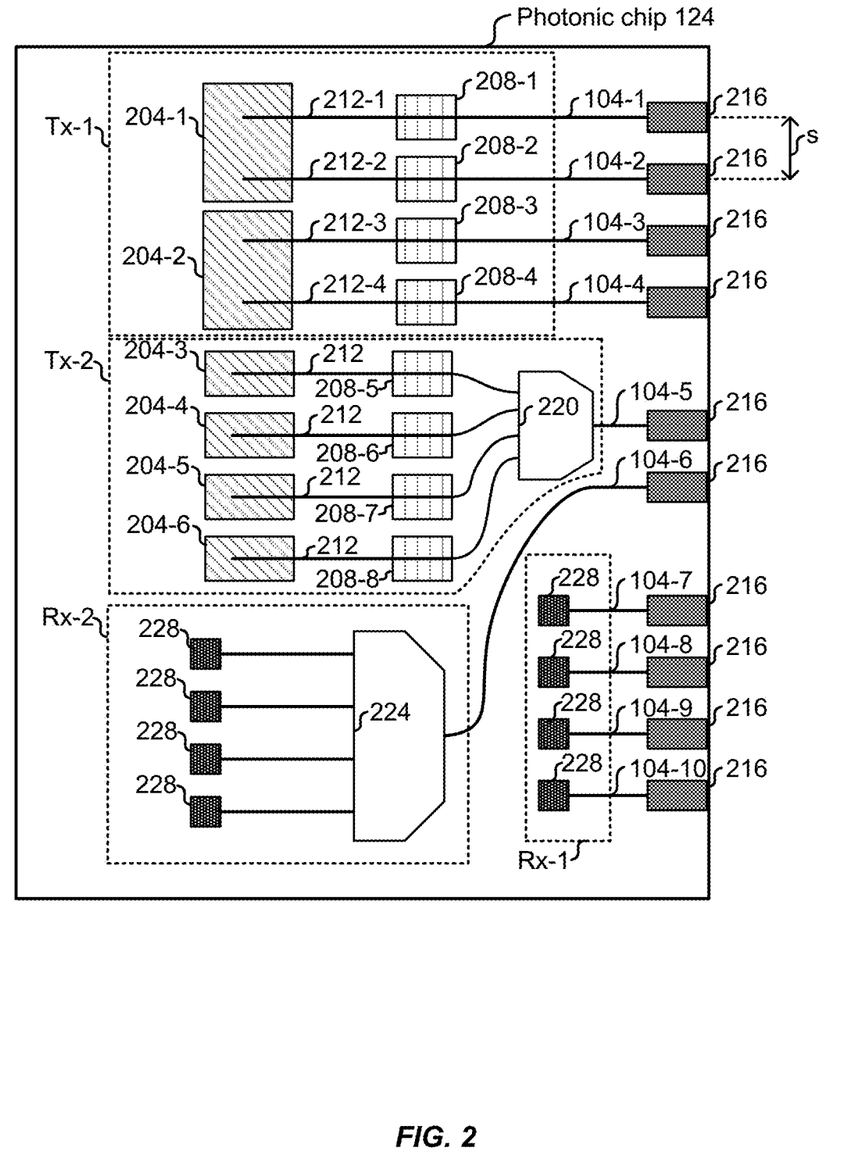
FIG. 2 depicts an embodiment of optical components of a photonic chip.

FIG. 2 depicts an embodiment of optical components on a photonic chip 124. The photonic chip 124 comprises the first transmitter Tx-1, the second transmitter Tx-2, the first receiver Rx-1, the second receiver Rx-2, and a plurality of waveguides 104 integrated on the photonic chip 124.

The first transmitter Tx-1 comprises a first gain chip 204-1, a second gain chip 204-2, a first modulator 208-1, a second modulator 208-2, a third modulator 208-3, a fourth modulator 208-4, a first waveguide 212-1, a second waveguide 212-2, a third waveguide 212-3, and a fourth waveguide 212-4. In some embodiments the gain chips 204 and/or the modulators 208 are III-V chips and/or bonded to a silicon substrate. Waveguides 212 are formed in crystalline silicon (e.g., single-crystal silicon) and optically couple gain chips 204 with modulators 208. The first waveguide 212-1 optically couples the first gain chip 204-1 with the first modulator 208-1. The second waveguide 212-2 optically couples the first gain chip 204-1 with the second modulator 208-2. The third waveguide 212-3 optically couples the second gain chip 204-2 with the third modulator 208-3. The fourth waveguide 212-4 optically couples the second gain chip 204-21 with the fourth modulator 208-4. One gain chip can be used for one, two, or more lasers (e.g., as described in U.S. patent application Ser. No. 15/426,375, filed on Feb. 7, 2017, which is incorporated by reference for all purposes). A gain chip 204 is a type of optical emitter.

The first waveguide 104-1 optically couples light from the first modulator 208-1 with a spot-size converter 216, for coupling light from the first modulator 208-1 off the photonic chip 124. The second waveguide 104-2 optically couples light from the second modulator 208-2 with a spot-size converter 216, for coupling light from the second modulator 208-2 off the photonic chip 124. The third waveguide 104-3 optically couples light from the third modulator 208-3 with a spot-size converter 216, for coupling light from the third modulator 208-3 off the photonic chip 124. The fourth waveguide 104-4 optically couples light from the fourth modulator 208-4 with a spot-size converter 216, for coupling light from the fourth modulator 208-4 off the photonic chip 124.

The second transmitter Tx-2 comprises a third gain chip 204-3, a fourth gain chip 204-4, a fifth gain chip 204-5, a sixth gain chip 204-6, a fifth modulator 208-5, a sixth modulator 208-6, a seventh modulator 208-7, an eighth modulator 208-8, a multiplexor (MUX) 220, and waveguides 212. The waveguides 212 optically couple light from gain chips 204 with modulators 208.

The gain chips 204 generate light. Light is guided from the gain chips 204 to the modulators 208 by waveguides 212. Modulators 208 are electrically coupled with the RF inputs 112 (e.g., by the first switch 108-1). Modulators 208 vary light, which is generated by the gain chips 204, based on signals from the RF inputs 112, to create optical signals. The MUX 220 combines light received from the fifth modulator 208-5, the sixth modulator 208-6, the seventh modulator 208-7, and the eighth modulator 208-8 into the fifth waveguide 104-5 so that the fifth waveguide 104-5 carries four optical signals. The fifth waveguide 104-5 guides light from the MUX 220 to a spot-size converter.

The second receiver Rx-2 comprises a de-multiplexor (DEMUX) 224 and a first plurality of photodetectors 228. A multiplexed signal from off the photonic chip 124 is coupled onto the photonic chip 124 by a spot-size converter 216 and into the sixth waveguide 104-6. The multiplexed signal is guided by the sixth waveguide 104-6 to the DEMUX 224. The DEMUX 224 divides the multiplexed signal into individual signals, which are then detected by the first plurality of photodetectors 228.

The first receiver Rx-1 comprises a second plurality of photodetectors 228. Light from off the photonic chip 124 is coupled into spot-size converters 216 and into the second plurality of photodetectors 228 via the seventh waveguide 104-7, the eighth waveguide 104-8, the ninth waveguide 104-9, and the tenth waveguide 104-10. Photodetectors 228 are electrically coupled with the RF outputs 116 (e.g., using the second switch 108-2). The first waveguide 104-1, the second waveguide 104-2, the third waveguide 104-3, the fourth waveguide 104-4, the seventh waveguide 104-7, the eighth waveguide 104-8, the ninth waveguide 104-9, and the tenth waveguide 104-10 each carry an optical signal having just one wavelength, whereas the fifth waveguide 104-5 and the sixth waveguide 104-6 each carry optical signals with multiple wavelengths (e.g., signals on four different wavelengths).

Spacing s between waveguides 104 and/or the spot-size converters 216 is configured to match spacing between ports of the fiber ribbon cable 122, the connector 120, and/or the fiber array 128. Of note, the spacing between the fourth waveguide 104-4 and the fifth waveguide 104-5 is 2 s; and the spacing between the sixth waveguide 104-6 and the seventh waveguide 104-7 is 2 s.

Waveguides 104 can be formed in thick silicon (e.g., from 0.7 µm to 5 µm thick; from 1 µm to 3 µm thick; and/or in a device layer of an SOI (silicon-on-insulator) wafer). In some embodiments, gain chips 204 and/or modulators 208 are formed by III-V chips being integrated into the silicon photonic chip 124 (e.g., the silicon photonics chip 124 being formed from an SOI wafer) as described in U.S. patent application Ser. No. 14/509,914, filed on Oct. 8, 2014, which is incorporated by reference for all purposes.

Figure 3:
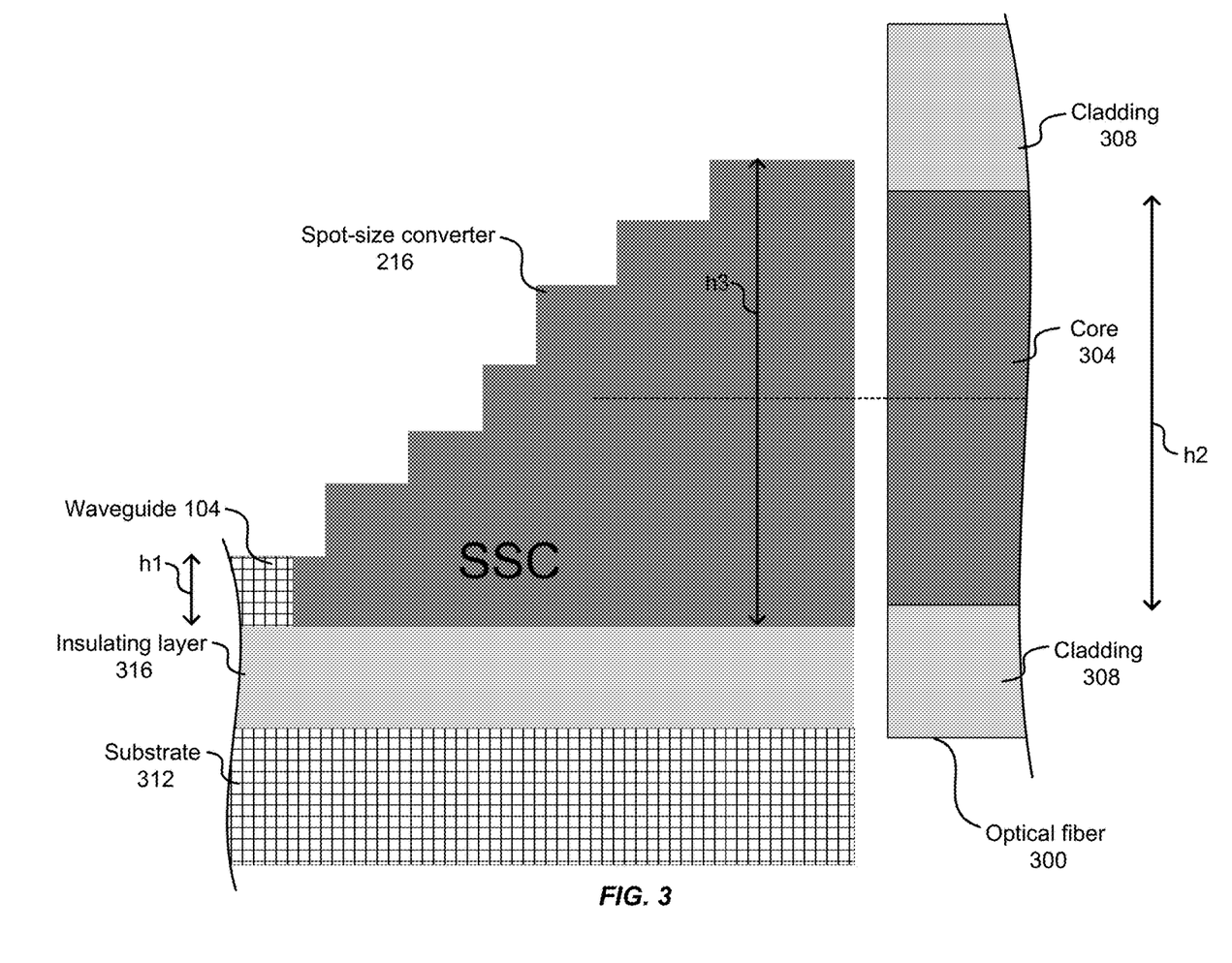
FIG. 3 depicts an embodiment of a spot-size converter interfacing with an optical fiber.

FIG. 3 depicts an embodiment of a spot-size converter 216 interfacing with an optical fiber 300 (e.g., a single-mode fiber). The optical fiber 300 comprises a core 304 and a cladding 308. The spot-size converter 216 expands an optical beam from the waveguide 104 to mode match the core 304 of the optical fiber 300 (e.g., for low coupling loss and/or to provide a larger alignment tolerance for a ferrule of the fiber array 128).

The core 304 of the optical fiber 300 has a cross section much larger than a cross section of the waveguide 104. For example, the waveguide 104 has a first height h1, the core 304 of the optical fiber 304 has a height h2, and the spot-size converter 216 has a maximum height h3. In some embodiments, h1 is equal to or greater than 0.9, 1.0, 1.3, or 1.5, µm and equal to or less than 4.0, 3.0, 2.0, 1.8, or 1.5 µm, such as 1.2, 1.3, or 1.5 µm; h2 is equal to or greater than 8 µm and equal to or less than 9 µm, such as 8.0, 8.2, 8.4, 8.6, 8.0, or 9 µm; and/or h3 is equal to or greater than 7 µm and equal to or less than 14 µm, such as 9, 10, 11, 12, or 13 µm. In some embodiments, h2 is equal to or greater than 3, 4, or 8 times h1 and/or h2 is equal to or less than 10 or 20 times h1. In some embodiments h3 is greater than h2 (e.g., because of different index differences between the spot-size converter 216 and a cladding material over the spot-size converter 216 and an index difference between the core 304 and the cladding 308 of the optical fiber 300). In some embodiments, a ferrule of the fiber array 128 and/or a ferule (e.g., other half of connector 120) of the fiber ribbon cable 122 holds the optical fiber 300.

A substrate 312 and an insulating layer 316 of the photonic chip 124 are shown. In some embodiments, the photonic chip 124 is formed from a silicon-on-insulator (SOI) wafer, wherein the substrate 312 is formed from a handle portion of the SOI wafer, and the insulating layer 316 is a buried-oxide (BOX) layer of the SOI wafer. The spot-size converter 216 is formed on the substrate 312 (e.g., directly on the substrate 312 by contacting or being bonded to the substrate 312, or indirectly by being formed on the insulating layer 316). In some embodiments, spot-size converters are formed using mode expanders as described in U.S. patent application Ser. No. 14/615,942, filed on Feb. 6, 2015; Ser. No. 14/722,970, filed on May 27, 2015; Ser. No. 14/722,983, filed on May 27, 2015; Ser. No. 5/051,348, filed on Feb. 23, 2016; and 62/577,052, filed on Oct. 25, 2017, which are incorporated by reference for all purposes. In some embodiments, the spot-size converter 216 is formed using amorphous silicon and/or polycrystalline silicon. The waveguide 104 and/or the substrate 312 are formed in crystalline silicon (e.g., single crystal silicon). The core 304 of the optical fiber 300 is aligned with the spot-size converter 216.

Figure 4:
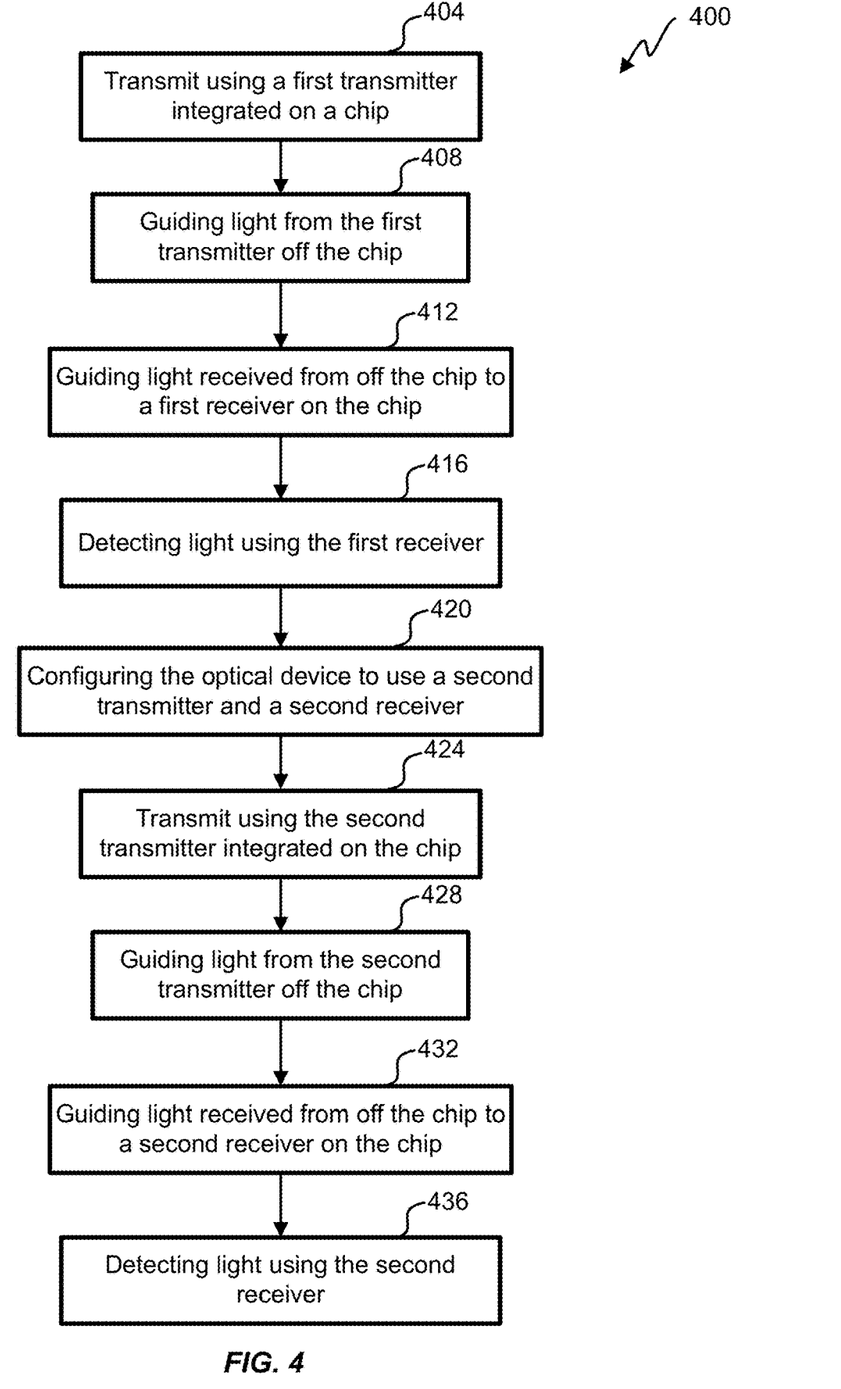
FIG. 4 illustrates a flowchart of an embodiment of a process for using an optical device.

FIG. 4 illustrates a flowchart of an embodiment of a process 400 for using an optical device. Process 400 begins in step 404 with transmitting, using a first transmitter (e.g., the first transmitter Tx-1) integrated on a chip (e.g., the photonic chip 124), modulated light corresponding to optical communication using a first optical-communication protocol. In step 408, light is guided from the first transmitter off the chip using a plurality of output waveguides (e.g., waveguides 104-1 to 104-4) integrated on the chip. Light received from off the chip is guided to a first receiver (e.g., the first receiver Rx-1) using a plurality of input waveguides (e.g., waveguides 104-7 to 104-10) integrated on the chip, step 412. In step 416, modulated light is detected using the first receiver (e.g., using photodetectors 228 of the first receiver Rx-1), wherein light was modulated using the first the first optical-communication protocol. In some embodiments, the first optical-communication protocol is PSM4 (e.g., not multiplexed, four channels, and 25 Gb/s per channel). Steps 404-416 could be used by the optical device in a server before the server is upgraded to use a second optical-communication protocol (e.g., the second optical-communication protocol could be CWDM4; multiplexed, four channels, and 25 Gb/s per channel).

In step 420 the optical device is configured to use a second transmitter (e.g., Tx-2) and a second receiver (Rx-2) instead of using the first transmitter and the first receiver. For example, the optical device is in a server, and the server is upgraded to communicate using CWDM4. The optical device is configured by a software update that causes the first switch 108-1 to change from routing signals from RF inputs 112 to the first transmitter Tx-1 to routing signals from the RF inputs 112 to the second transmitter Tx-2; and to change the second switch 108-2 from routing signals from the first receiver Rx-1 to the RF outputs 116 to routing signals from the second receiver Rx-2 to the RF outputs 116. In some embodiments, electrical power to optical components is also switched (e.g., power is cut to gain chips 204-1 and 204-2, and power is supplied to gain chips 204-3 to 204-6; and power is cut to photodetectors 228 of the first receiver Rx-1, and power is supplied to the photodetectors 228 of the second receiver Rx-2.).

After configuring the optical device to use the second transmitter and the second receiver, the second transmitter transmits modulated light corresponding to optical communication using the second optical-communication protocol, step 424. Light from the second transmitter is guided by one or more output waveguides (e.g., the fifth waveguide 104-5) off the chip (e.g., through the fifth waveguide 104-5 and through a spot-size converter 216), step 428. In step 432, modulated light, which corresponds to optical communication, from off the chip is guided to the second receiver using one or more input waveguides (e.g., the sixth waveguide 104-6) integrated on the chip. Modulated light from off the chip is then detected using the second optical-communication protocol (e.g., by being de-multiplexed by the DEMUX 224 and detected by the photodetectors 228 of the second receiver Rx-2), step 436.

In some embodiments, the first optical-communication protocol (such as PSM4) uses one optical signal per waveguide (e.g., waveguides 104-1 to 104-4 each carry only one signal each), and/or the second optical-communication protocol (such as CWDM4) uses multiple optical signal per waveguide (e.g., waveguide 104-5 carries four signals).

Figure 5:
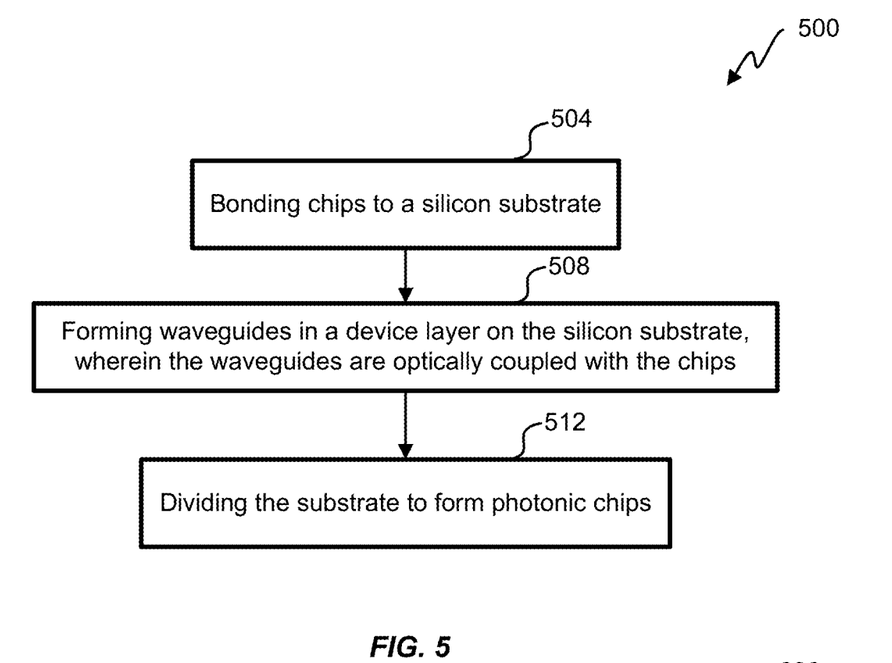
FIG. 5 illustrates a flowchart of an embodiment of a process for building an optical device having two transceivers.

FIG. 5 illustrates a flowchart of an embodiment of a process 500 for building an optical device having two transceivers integrated on a photonic chip. Process 500 begins in step 504 with bonding chips to a silicon substrate. For example, gain chips 204 and/or modulators 208 are bonded to an SOI wafer as described in the '785 patent, U.S. Pat. No. 9,922,967, granted on Mar. 20, 2018, and/or U.S. patent application Ser. No. 15/426,823, filed on Feb. 7, 2017 (e.g., bonding gain chips 204 and modulators 208 in pits of an SOI wafer). Waveguides (e.g., waveguides 104 and/or waveguides 212) are formed in a device layer on the silicon substrate, wherein the waveguides are optically coupled with the chips (e.g., as described in the '785 patent), step 508. In some embodiments, waveguides 104 are formed (and/or other optical structures such as multiplexors, demultiplexors, and spot-size converters), one or more pits are etched after forming the waveguides 104 (and/or after forming other optical structures), and/or chips (e.g., III-V chips) for gain chips 204 and/or modulators 208 are bonded in the one or more pits after forming the waveguides 104 (and/or after forming other optical structures). In step 512, the substrate is divided to form a plurality of photonic chips 124 (e.g., as described in the '967 patent), wherein each photonic chip 124 of the plurality of photonic chips 124 comprise elements for a first optical transceiver and a second optical transceiver. The substrate can be divided by dicing (e.g., as described in '967 patent) and/or by etching (e.g., as described in U.S. patent application Ser. No. 15/592,704, filed on May 11, 2017, which is incorporated by reference for all purposes).

In some embodiments, photodiodes (e.g., photodetectors 228) are formed on the silicon substrate (e.g., using Ge epitaxially grown and/or using III/V chips bonded in pits of the SOI wafer) to form a receiver.

Figure 6:
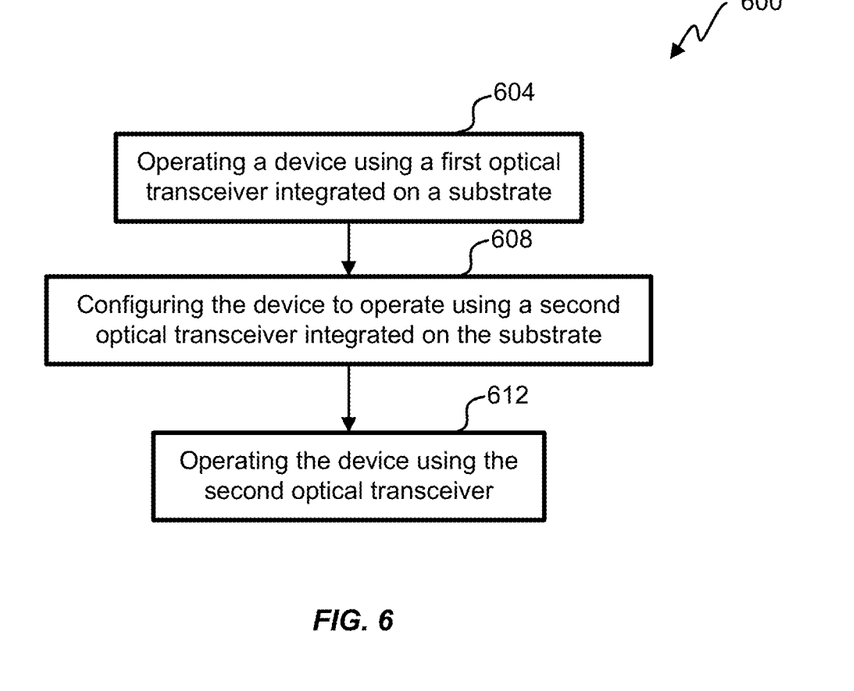
FIG. 6 illustrates a flowchart of an embodiment of a process for operating a device as a first transceiver and as a second transceiver.

FIG. 6 illustrates a flowchart of an embodiment of a process 600 for operating a device as a first transceiver and as a second transceiver. Process 600 begins in step 604 with operating the device using a first transceiver (e.g., for PSM4 communication) integrated on a substrate. In step 608, the device is configured to operate using a second transceiver integrated on the substrate (e.g., by using switches 108 or plugging RF inputs 112 into the second transmitter Tx-2 and/or plugging RF outputs 116 into the second receiver Rx-2). The device is then operated using the second transceiver (e.g., for CWDM4 communication), step 612.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. For example, the QSFP module described above refers to a particular implementation targeting today's market. Similar principles and architecture could be applied on a continuing basis as modulation rates and data formats progress. For example, 4×100 Gb/s parallel transmission format could be combined to 400 Gb/s CWDM transmission. As another example, firmware could be used to determine which transceiver is used, e.g., firmware controls switches 108; or switches 108 are replaced with electrical splitters and firmware determines which (or both) transceivers receive power. Thus RF inputs 112 could be routed to both the first transmitter Tx-1 and the second transmitter Tx-2 and only one transmitter Tx receives electrical power (or both transmitters Tx could receive electrical power and light from one transmitter Tx is not used); and both receivers Rx could be electrically coupled with RF outputs 116 (e.g., and light to one of the receivers Rx is blocked so that no or low electrical signals are transmitted from the one receiver Rx to the RF outputs 116). In many cases, splitters can be used because RF inputs 112 and RF outputs 116 remain the same data rate regardless of which transceiver is used (e.g., 25 Gb/s, plus or minus 1, 3, or 5 Gb/s).

The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. An apparatus for use as an optical transceiver, the apparatus comprising:
 a photonic chip;
 a first transmitter integrated on the photonic chip, wherein the first transmitter is configured to use a first optical communication protocol;
 a first receiver integrated on the photonic chip, wherein the first receiver is configured to use the first optical communication protocol;

a second transmitter integrated on the photonic chip, wherein the second transmitter is configured to use a second optical communication protocol;
a second receiver integrated on the photonic chip, wherein the second receiver is configured to use the second optical communication protocol; and
a plurality of input waveguides, wherein:
the plurality of input waveguides are integrated on the photonic chip; and
the plurality of input waveguides are configured to guide light received from off of the photonic chip to the first receiver and to the second receiver; and
a plurality of output waveguides, wherein:
the plurality of output waveguides are integrated on the photonic chip; and
the plurality of output waveguides are configured to guide light from the first transmitter and from the second transmitter off of the photonic chip.

2. The apparatus of claim 1, further comprising:
a first switch electrically coupled with a plurality of electrical inputs, with the first transmitter, and with the second transmitter, wherein the first switch is used to change routing of input signals of the plurality of electrical inputs from the first transmitter to the second transmitter; and
a second switch electrically coupled with a plurality of electrical outputs, with the first receiver, and with the second receiver, wherein the second switch is used to change routing of output signals to the plurality of electrical outputs from the first receiver to the second receiver.

3. The apparatus of claim 2, wherein the plurality of electrical inputs consists of four electrical inputs configured to transmit at 25 Gb/s.

4. The apparatus of claim 1, wherein:
the first optical communication protocol is PSM4; and
the second optical communication protocol is CWDM4.

5. The apparatus of claim 1, further comprising a fiber array optically coupled with the plurality of input waveguides and the plurality of output waveguides.

6. The apparatus of claim 5, further comprising an optical connector for coupling to a fiber ribbon cable, wherein the optical connector is optically coupled with the fiber array.

7. The apparatus of claim 5, wherein spacing between waveguides of the plurality of input waveguides and of the plurality of output waveguides are spaced to match spacing of fibers in the fiber array.

8. The apparatus of claim 7, wherein a number of fibers in the fiber array is equal to twelve.

9. The apparatus of claim 1, wherein the plurality of output waveguides comprises:
four waveguides optically coupled to the first transmitter; and
only one waveguide optically coupled to the second transmitter.

10. The apparatus of claim 1, wherein the plurality of input waveguides are made of crystalline silicon.

11. The apparatus of claim 1, wherein the first transmitter comprises:
a first gain medium, wherein the first gain medium is optically coupled with a first modulator and a second modulator; and
a second gain medium, wherein the second gain medium is optically coupled with a third modulator and a fourth modulator.

12. The apparatus of claim 1, wherein the second transmitter comprises:
four optical emitters; and
a multiplexer for combining light from the four optical emitters.

13. The apparatus of claim 1, further comprising a spot-size converter integrated on the photonic chip, wherein the spot-size converter is used to expand an optical beam from a waveguide, of the plurality of output waveguides, to an optical fiber, wherein a core of the optical fiber has a larger cross section than a cross section of the waveguide of the plurality of output waveguides.

14. The apparatus of claim 13, wherein the spot-size converter is formed using amorphous silicon or polycrystalline silicon.

15. An apparatus comprising:
a photonic chip;
a first transmitter integrated on the photonic chip;
a first receiver integrated on the photonic chip;
a second transmitter integrated on the photonic chip;
a second receiver integrated on the photonic chip;
a plurality of spot-size converters; and
a plurality of waveguides optically coupling the first transmitter, the first receiver, the second transmitter, and the second receiver with the plurality of spot-size converters.

16. The apparatus of claim 15, wherein the photonic chip comprises a silicon substrate.

17. The apparatus of claim 15, wherein a spacing between the plurality of spot-size converters is configured to match a spacing between ports of an optical connector.

18. The apparatus of claim 15, wherein:
the first transmitter comprises parallel transmissions on multiple waveguides of the plurality of waveguides; and
the second transmitter comprises a multiplexer to transmit multiple optical-transmission signals in a single waveguide of the plurality of waveguides.

* * * * *